Figure 1:
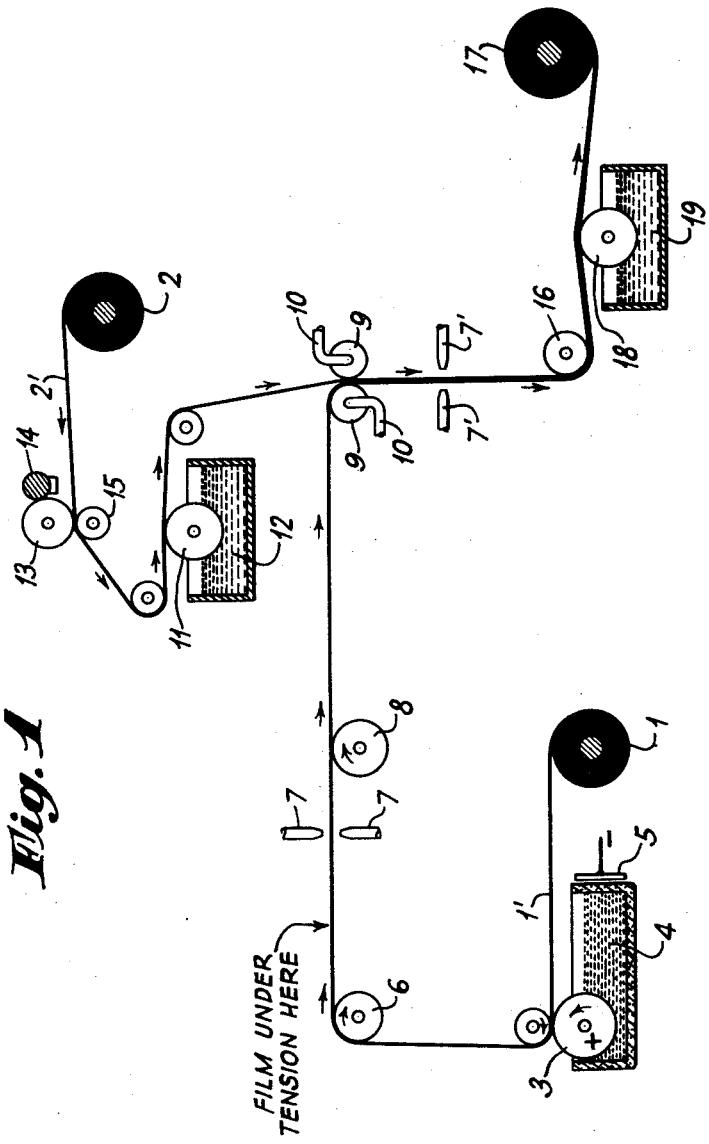

Patented June 16, 1942

2,286,569

UNITED STATES PATENT OFFICE 2,286,569

PROCESS FOR PRODUCING LIGHT POLARIZING BODIES

Leon Pollack, Brooklyn, N. Y.

Application March 11, 1938, Serial No. 195,248

20 Claims. (Cl. 88—65)

The present invention relates generally to improvements in light polarizing bodies and to processes for producing the same.

Among the objects of the present invention are: To provide a simple and economical process for producing a sheet of material capable of polarizing light; to enable the deposit of a layer of oriented polarizing particles on a moving supporting medium; to provide a waterproof sheet of material capable of polarizing light; to provide a light polarizing body in the form of an adhesive tape; to provide a reinforced flexible laminated light polarizing body; to provide a laminated waterproof light polarizing body composed of a plurality of layers of material consolidated under pressure and/or heat; to provide a simple process for quickly setting or hardening the layer of oriented polarizing particles deposited on a supporting medium.

More specific objects of the invention are: To provide a light polarizing body having a water resistant coating containing a vinyl compound; and to provide a multi-layer, light polarizing body having printing impressed on one of the layers thereof to function as a transparent seal or advertising device.

Other objects will appear in the description forming a part of this specification, but I do not limit myself to the embodiments of the invention herein described, as various forms may be adopted within the spirit and scope of the appended claims.

In the accompanying drawings, in which are shown several of the various possible embodiments of this invention, the same parts are designated by the same reference numerals.

Figure 2:
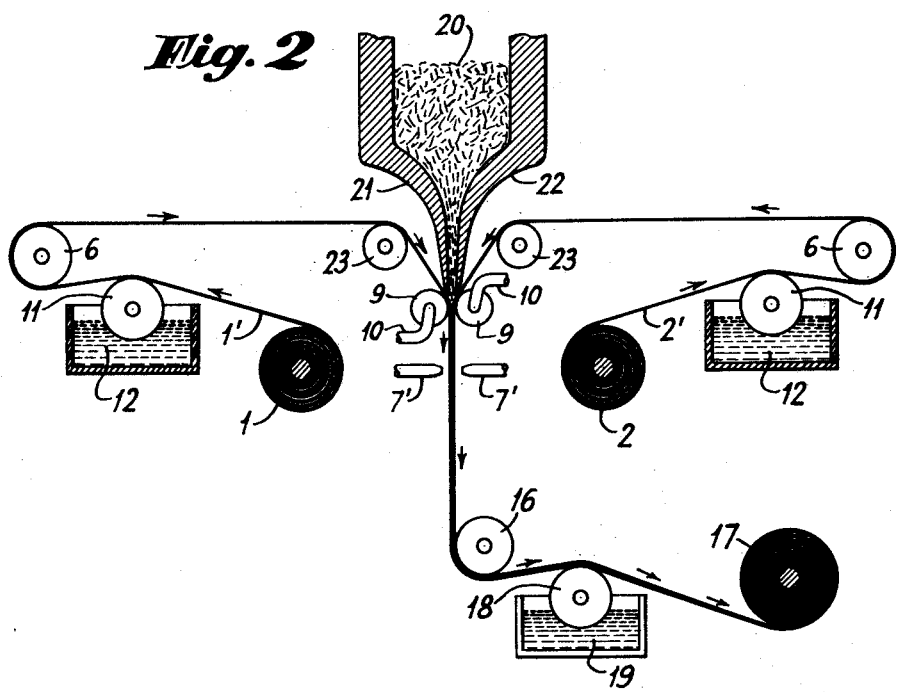
Figure 3:
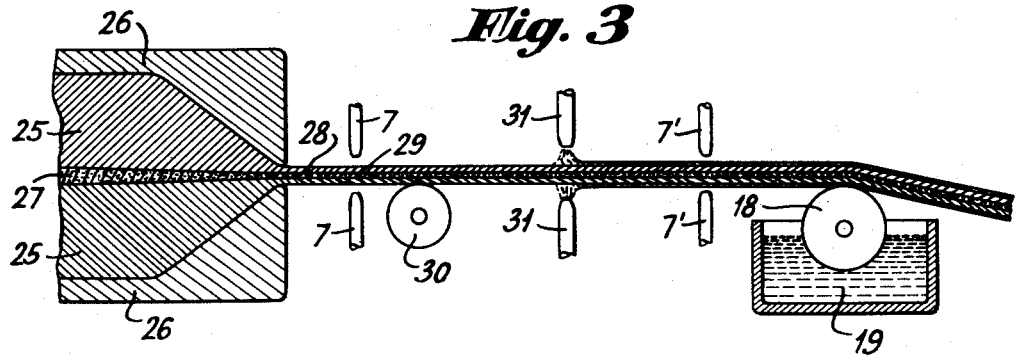

Figs. 1, 2 and 3 are diagrammatic views illustrating the application of different processes for producing my light polarizing body.

Referring to Fig. 1 of the drawings, reference numerals 1 and 2 represent supply rolls of transparent films 1' and 2', respectively, of suitable materials. Film 1' provides the support for the colloidal particles or crystals to be deposited thereon in axial alignment by roll 3 rotating partly submerged in a receptacle 4 containing the particles in substantial parallelism. Films 1' and 2' may comprise suitable flexible sheets of gelatin or cellulose derivatives of any desired width, properly treated to have thoroughly cleaned surfaces and be stretchable before being consolidated in the resulting laminated product. For that matter, sheet 1' may be glass, or the same material as the viscous mass comprising the suspension in receptacle 4 containing the crystals. One ingredient of this suspension may, for example, be cellulose nitrate, a suitable derivative of cellulose.

The suspending medium in receptacle 4, containing the crystals, is of a proper viscosity to permit the crystals to be uniformly deposited by slowly rotating roller 3 upon one surface of the sheet material 1' wound from the supply roll 1. The crystals in the suspending medium are dichroic, preferably colorless, and of any suitable type having polar characteristics; for example, herapathite crystals (sulphate of iodoquinine) or purpureocobaltchloridesulphateperiode. The crystals are relatively small, of asymmetric contour (i. e., rod-like or needle-like), and homogeneously embedded in the cellulose acetate suspension.

In order to orient these crystals in alignment in the viscous suspension, I employ, preferably, an electric field between roller 3 and a plate 5, located at opposite ends of the receptacle 4, as shown. The suspending medium prevents any tendency of the suspended oriented crystals in the receptacle to flocculate, thus enabling the slowly rotating roller 3 to deposit the crystals on the advancing sheet 1', uniformly distributed and in the same alignment that they possess in the receptacle. If desired, a suitable primer coating may be applied to the under surface of sheet 1' to insure adhesion between the crystals and the advancing sheet.

From the crystal applying roll 3, the coated film or sheet 1' passes over a guide roll 6 and between a pair of nozzles 7 from which jets of cooling air may be projected to hasten the setting or hardening of the coating of crystal suspension on the film 1' by controlling the evaporation of the solvent in the solution. A suitable tension producing or stretching mechanism, herein indicated diagrammatically by drive roller system 8, is run at a somewhat greater speed than rollers 3 and 6, in order to supply uniform tension to the flexible and stretchable film 1' in its direction of travel, as indicated by the arrows. This tension on the film 1' forming the bed, so to speak, for the crystals, produces stretching which insures the desired orientation of the crystals which are set or hardened by nozzles 7 before they have had an opportunity to relax, if there is any such tendency present. In the event that auxiliary means are not employed to accelerate the setting, the drive roll 8 is positioned at such a distance from the roll 6 that the crystal suspension assumes its natural oriented position prior to passing over this roll.

After passing roll 8, the coated film 1' is passed between a pair of squeeze or pressure rolls 9 where the stretched film 1' is consolidated under pressure with film 2' advancing from supply roll 2. Rolls 9 may, if desired, be heated, as indicated diagrammatically by the showing of steam pipes 10.

Film 2' is first prepared for lamination with coated film 1' by applying to that surface of 2' which is to contact the coated film 1' a coating of suitable transparent cement such as Canada balsam. This cement is applied by means of the rotating roll 11, which is partly immersed in a bath 12 of the cement.

If desired, there may be provided suitable printing mechanism for printing on one or both sides of the film 2' prior to its consolidation with film 1'. Such mechanism may comprise a plate roller 13, an inking roller 14, and a platen roller 15.

After consolidation of the two films 1' and 2' under pressure and/or heat by rolls 9, the laminated product is advanced to pass under nozzles 7' from which jets of cooling air are projected, before the laminated structure passes over guide roll 16 to be wound upon storage roll 17. The resulting structure is a laminated, flexible, reinforced light polarizing body.

If it is desired to make an adhesive tape from the consolidated laminated light polarizing body, this may be done by applying a suitable adhesive, preferably a transparent pressure-sensitive, water-insoluble kind, to one of the outer surfaces of the laminated body; for example, as by a rotating roller 18 immersed in part in a bath 19 of adhesive material. Such an adhesive may have a rubber base and be mixed with suitable resins.

If transparent films 1' and 2' are made of a gelatinous composition or cellulose acetate, they may be treated to be moisture proof before being placed on their respective supply rolls 1 and 2, or after being laminated in the resulting consolidated structure but before the adhesive from bath 19 is applied. In order to moisture proof the laminated structure, I propose to coat the outside surfaces thereof with a composition containing a vinyl compound dissolved in a suitable solvent or mixture of solvents. Vinyl chloride and vinyl acetate are examples of suitable vinyl compounds, the former giving especially water resistant properties to the coating. These compounds are, at ordinary temperatures, solid, and are first dissolved in an organic solvent, or a mixture of solvents, preferably including solvents of the coal tar hydrocarbons, such as benzene and its homologues. It is advantageous to add to the coal tar hydrocarbons used as solvents another solvent that is miscible with water, such as acetone or ethyl acetate. Various plasticizers of the type used in the manufacture of pyroxylin, such as tricresyl phosphate, esters of phthalic acid including butyl and dibutyl phthalate and the like may be used. It is also desirable to add a gum or resin to the coating composition. Either vinyl acetate or vinyl chloride can be used alone without the other, or used together in various proportions. When vinyl acetate is used without vinyl chloride, the addition of a resyl, a polymerization product of glycerine with phthalic anhydride and oleic acid, gives a satisfactory film.

Where films 1' and 2' are made of glass, it will be obvious that the resulting laminated product is inherently waterproof and requires no extra coating. If desired, films 1' and 2' may be made of a specially treated flexible rubber material known by the trade-name "Pliofilm." This material is transparent and waterproof. Other materials having similar properties may also be used for the films.

Fig. 2 illustrates another process for producing a laminated light polarizing structure. In this figure, the colloidal mass 20 containing polarizing crystals of the type described above, having their polarizing axes disposed at random, is extruded between die-members 21 and 22. These members apply frictional force to the sides of the extruded mass and thereby cause, by the stroking action, an orientation of the long crystals so that their geometrical and polarizing axes all point substantially in the same direction. It should be understood that the members 21, 22 and mass 20 are shown greatly magnified.

The films 1' and 2' of the process of manufacture illustrated in Fig. 2 are each coated on one surface with suitable cement from baths 12 prior to their passage over guide rolls 23 and consolidation with the layer 24 of suspension of oriented crystals. The cement coated surface of each film is arranged to be adjacent the suspension layer of crystals which it is adapted to contact.

Since most of the elements employed in Fig. 2 to carry out the process have their counterpart in Fig. 1 and are similarly labeled, it is believed that the operation of the system of Fig. 2 will be apparent from what has been stated above.

Fig. 3 illustrates mechanism for carrying out still another process for producing a light polarizing laminated structure, in accordance with the present invention. In this particular process, two layers of material 25 are placed in a chamber formed by walls 26 and between these layers is placed a layer 27, preferably relatively thin, of material containing crystals. Layer 27 is a viscous suspension containing polarizing crystals of the type described above, which are uniformly distributed and embedded therein. Layers 25 contain no crystals, have viscosities somewhat similar to layer 27 and may, if desired, consist of the same material as the suspending medium of layer 27. By means of a piston, not shown, the layers 25 and intermediate layer 27 is extruded through opening 28 in the end of the chamber. Opening 28 has dimensions substantially similar to a cross-section of layer 27. As the material is extruded, the central layer is subjected to a pure uniform stretch, and the crystals orient themselves so that their long axes are in the direction of flow. They thus act uniformly to polarize light passing through them. The layer 27 is protected from contact with the edges of the opening 28 by adjacent layers 25.

As the sheet of polarizing material 29 composed of the central layer containing the oriented crystals and the adjacent layers devoid of crystals passes out of the opening, I propose to apply a cooling gaseous fluid from nozzles 7 to harden the sheet before spraying a waterproofing material on the outer surfaces of the sheet. Drive roller 30 is used to advance polarizing sheet between spray jets 31 which apply a suitable water-resistant coating on both sides of sheet 29. It is preferred that this coating be made of a composition containing a vinyl compound of the type described hereinabove. After the water-resistant coatings are applied, the sheet is further advanced between cooling nozzles 7' which accelerate the hardening of the coatings. The laminated product is now ready for the application of a pressure-sensitive water-insoluble adhesive by rotating roller 18 partly immersed in the bath of adhesive material 19.

Where the resulting laminated product of Figs. 1, 2 and 3 is in the form of wide sheets, these may be cut up into small rolls by rotary knives suitably spaced along the width of the sheet.

Although I have described the use of water-resistant films before consolidation, and the use of water-resistant coatings for the laminated structure after consolidation, other methods of making the light polarizing body water-resistant may also be used. For example, I contemplate using a water-resistant transparent material for the suspension medium in which the polarizing crystals are homogeneously embedded. In other words, the viscous suspension medium in receptacle 4 of Fig. 1, the viscous suspension medium 20 of Fig. 2, and the viscous suspension medium of layer 27 of Fig. 3, may all include a suitable water-resistant composition. Similarly, if desired, the two layers 25 of Fig. 3, which contain no crystals, may be composed of a suitable transparent water-resistant composition, in which case the suspension medium of layer 27 may or may not, as desired, contain a similar water-resistant composition. Where it is desired to make the viscous suspension medium of any of the three figures, or the layers 25 of Fig. 3, water-resistant, it is preferred that a composition containing a vinyl compound be employed. The type of vinyl compound and the elements going to make up the water-resistant composition which may be used is described above in connection with moisture-proof coatings.

It should be distinctly understood that the present invention is not restricted to the use of the complete processes described hereinabove, since, if desired, any desired part of any one of the processes described in this specification may be employed alone, or in combination with the other parts of other processes, without departing from the spirit and scope of the invention.

The terms "film" and "sheet" employed in the foregoing description and in the appended claims have been used interchangeably to mean a relatively thin layer or coating of supporting material of any suitable size and width.

What is claimed is:

1. The process of making a light polarizing body which includes the steps of advancing a flexible and stretchable transparent film of supporting material, simultaneously applying to one surface of said film a coating of an organic plastic having embedded therein dichroic particles, applying tension to said film in the direction in which it is traveling to produce stretching which tends to more completely orient said particles in permanent substantial parallelism, and setting said coating while said film is advancing and tension is being applied thereto.

2. The process of making a light polarizing body which includes the steps of forming a plastic suspension of polarizing crystals of asymmetric contour, unwinding a roll of transparent backing material, orienting said crystals in substantial parallelism by extruding said suspension upon one side of said backing material while it is moving, and setting said suspension with said crystals in permanent alignment upon said backing material while it is moving.

3. The process of forming a light polarizing body which comprises forming a plastic suspension of polarizing crystals of asymmetric contour, advancing a thin, flexible and stretchable backing material, applying said suspension to one side of said backing while it is moving, subjecting said advancing backing to a stretching operation, whereby the shape of said suspension is altered and the crystals therein are caused to align in parallelism, and setting said suspension to produce permanent alignment of said crystals.

4. The process of making a light polarizing body which comprises forming a plastic suspension of dichroic crystals of asymmetric contour, expelling said suspension through an orifice upon a moving transparent film, orienting said crystals in substantial parallelism by stretching said suspension while on said moving film, and setting said suspension on said moving film with the crystals oriented in permanent alignment.

5. The process of making a light polarizing body which includes the steps of preparing a solution of a viscous coating of cellulosic derivative material containing dichroic crystals, orienting said crystals in substantial parallelism by the use of an electric field, advancing a sheet of transparent supporting material and simultaneously applying to a surface of said sheet in permanently secured relation thereto a viscous coating of said cellulosic derivative material containing the oriented dichroic crystals, whereby said crystals are oriented at the point of application of said coating to said thin sheet of supporting material.

6. The process of making a light polarizing body which includes the steps of advancing a sheet of transparent supporting material, simultaneously applying to a surface of said sheet a coating of a suspending medium having dispersed therethrough a mass of colloidal dichroic particles and containing a solvent, orienting by extrusion the polarizing axes of said particles in substantial parallelism prior to its application to said sheet of transparent material, and evaporating said solvent from said coating to cause said coating to set with said particles in permanent alignment and permanently secured to said base.

7. The process of making a light polarizing body which includes the steps of advancing a flexible sheet of stretchable transparent supporting material, applying to one surface of said sheet a plastic cellulosic derivative coating having embedded therein particles of asymmetric contour, and subjecting said sheet and coating to a stretching operation in the direction in which the sheet is traveling for completely orienting said particles in permanent substantial parallelism.

8. The process of making a light polarizing body which includes the steps of advancing a flexible and stretchable transparent sheet of supporting material, simultaneously applying to one surface of said sheet a coating of organic plastic material having embedded therein particles of asymmetric contour, and applying tension to said sheet in the direction in which it is traveling to produce stretching which tends to completely orient said particles in permanent substantial parallelism.

9. The process of making a light polarizing body which includes the steps of unwinding a roll of flexible, transparent material and applying to a surface of said material as it is moving in permanently secured relation thereto a coating comprising a suspending medium of cellulose derivative material having dispersed therethrough a mass of colloidal polarizing particles, and orienting said particles with their polarizing axes in substantial parallelism at the point of application of said coating to said transparent material by subjecting the particles to a field of force to which they are responsive.

10. The process of making a light polarizing body which includes forming a bath of cellulose derivative material containing dichroic crystals, orienting the crystals in said bath by an electric field, applying a coating of said oriented crystals to an advancing thin film of stretchable transparent supporting material, applying tension to said film in the direction in which it is traveling to produce stretching which tends to more completely orient said particles in permanent substantial parallelism, and setting said coating while said film is advancing to retain said crystals in oriented position.

11. The process of making a light polarizing body which comprises forming a plastic suspension of dichroic crystals of asymmetric contour and containing a solvent, expelling said suspension through an orifice upon a moving transparent film to produce a coating of oriented crystals permanently secured to said film at the point of application to said film, and evaporating said solvent to set said suspension with said crystals in oriented position.

12. The process of making a light polarizing body which includes the steps of forming a plastic suspension of dichroic crystals of asymmetric contour, orienting by extrusion the polarizing axes of said crystals in substantial parallelism, applying a coating of said suspension of oriented crystals to an advancing sheet of transparent supporting material, setting said coating with said crystals in oriented position upon said advancing supporting material and permanently secured thereto, and applying to said coating a transparent protective lamina.

13. The process of making a light polarizing body which comprises forming a bath of material having embedded therein crystals of asymmetric contour, applying an electric field to said bath to orient said crystals in alignment, then depositing said oriented crystals suspended in said material and in the same alignment they possess in said bath upon a moving transparent base to form a coating for permanent association with said base.

14. The process of making a light polarizing body which includes the steps of advancing a transparent base material coated with a plastic suspension of dichroic particles and which suspension contains a solvent, subjecting said suspension in its plastic state to a field of force while said base material is advancing to thereby cause said particles to align in parallelism, evaporating from said aligned suspension on said base said solvent to produce setting of said suspension with said dichroic particles in alignment and permanently secured to said base, and applying to said suspension a transparent protective lamina by heat and pressure.

15. The process of making a light polarizing body which includes the steps of advancing a transparent base material coated with a plastic suspension of dichroic crystals and which suspension contains a solvent, orienting the crystals in said suspension in its plastic state by applying a field of force thereto while said base material is advancing, and while said crystals are oriented upon said base simultaneously evaporating from said suspension said solvent to cause said suspension to set with said crystals in permanent alignment and permanently secured to said base.

16. The process of making a light polarizing body which includes the steps of continuously depositing from a source of supply a material containing light polarizing particles upon a flexible and stretchable transparent supporting film for permanent association therewith, producing relative motion between said depositing source and said film to obtain a substantially uniform coating on said film, and applying tension to said film in the direction of said motion by applying a mechanical force thereto, in order to substantially completely orient said particles in substantial parallelism.

17. The process of making a light polarizing body which includes the steps of continuously depositing from a source of supply a substantially uniform coating of a material containing light polarizing particles upon a flexible and stretchable transparent supporting film for permanent association therewith, producing relative motion between said depositing source and said film, stretching said film and coating by applying a mechanical force uniformly to said film, whereby said particles are oriented in substantial parallelism, setting the resultant product, and laminating the same by adhesive to a waterproof transparent protective lamina.

18. The process of making a light polarizing body which includes the steps of producing relative motion between a flexible and stretchable transparent supporting film and a source of supply of material containing light polarizing particles, continuously depositing from said source on said film a substantially uniform coating of said material for permanent association therewith, permanently elongating said film to substantially completely orient said particles in parallelism by applying a mechanical force uniformly to said film, setting the resultant product, and laminating the resultant product on the side of the coating to a transparent protective lamina.

19. The process of making a light polarizing body which includes the steps of advancing a transparent base material, coating said base material with a plastic suspension of polarizing crystals and which suspension contains a solvent, orienting the crystals in said suspension in its plastic state at the point of application to said base material by applying a field of force thereto while said base material is advancing, and while said crystals are oriented upon said base simultaneously evaporating from said suspension said solvent to cause said suspension to set with said crystals in permanent alignment and permanently secured to said base.

20. The process of making a light polarizing body which includes the steps of unwinding a roll of flexible, transparent material and applying to a surface of said material as it is moving in permanently secured relation thereto a coating comprising a suspending medium of a vinyl compound material having dispersed therethrough a mass of light polarizing particles, and orienting said particles with their polarizing axes in substantial parallelism at the point of application of said coating to said transparent material by subjecting the particles to a field of force to which they are responsive.

LEON POLLACK.

DISCLAIMER 2,286,569.—*Leon Pollack*, Brooklyn, N. Y. PROCESS FOR PRODUCING LIGHT POLARIZING BODIES. Patent dated June 16, 1942. Disclaimer filed April 26, 1943, by the inventor; the assignee, *Polaroid Corporation*, consenting.

Hereby enters this disclaimer to claims 2, 6, 9, 11, 12, 13, 14, 15, 19, and 20 of said patent.

[*Official Gazette June 8, 1943.*]